United States Patent
Park

(10) Patent No.: US 10,958,912 B2
(45) Date of Patent: Mar. 23, 2021

(54) BIT PREDICTION BASED BIT RATE CONTROL METHOD AND APPARATUS FOR VIDEO CODING PROCESS SUPPORTING OFFLINE CABAC

(71) Applicant: CHIPS & MEDIA, INC, Seoul (KR)

(72) Inventor: Dong Jin Park, Seoul (KR)

(73) Assignee: CHIPS & MEDIA, INC, Seoul (KR)

( * ) Notice: Subject to any disclaimer, the term of this patent is extended or adjusted under 35 U.S.C. 154(b) by 0 days.

(21) Appl. No.: 16/488,060

(22) PCT Filed: Feb. 27, 2018

(86) PCT No.: PCT/KR2018/002394
§ 371 (c)(1),
(2) Date: Aug. 22, 2019

(87) PCT Pub. No.: WO2018/155996
PCT Pub. Date: Aug. 30, 2018

(65) Prior Publication Data
US 2020/0068202 A1 Feb. 27, 2020

(30) Foreign Application Priority Data
Feb. 24, 2017 (KR) .................. 10-2017-0024985

(51) Int. Cl.
| | | |
|---|---|---|
| *H04N 19/149* | (2014.01) | |
| *H04N 19/124* | (2014.01) | |
| *H04N 19/13* | (2014.01) | |
| *H04N 19/136* | (2014.01) | |
| *H04N 19/152* | (2014.01) | |
| *H04N 19/184* | (2014.01) | |

(52) U.S. Cl.
CPC .......... *H04N 19/149* (2014.11); *H04N 19/124* (2014.11); *H04N 19/13* (2014.11); *H04N 19/136* (2014.11); *H04N 19/152* (2014.11); *H04N 19/184* (2014.11)

(58) Field of Classification Search
CPC combination set(s) only.
See application file for complete search history.

(56) References Cited

U.S. PATENT DOCUMENTS

| | | | | |
|---|---|---|---|---|
| 8,520,734 | B1 * | 8/2013 | Xu ................. | H04N 19/105 375/240.02 |
| 2005/0180500 | A1 * | 8/2005 | Chiang ............ | H04N 19/14 375/240 |
| 2006/0222063 | A1 * | 10/2006 | Zhang .............. | H04N 19/53 375/240.03 |

FOREIGN PATENT DOCUMENTS

| | | | |
|---|---|---|---|
| JP | 2015-073177 A | | 4/2015 |
| KR | 10-2003-0000310 A | | 1/2003 |

(Continued)

*Primary Examiner* — Jonathan R Messmore
(74) *Attorney, Agent, or Firm* — Novick, Kim & Lee, PLLC; Sang Ho Lee

(57) ABSTRACT

Provided is a bit rate control methods includes determining an input bit count for a rate quantization model according to a target bit rate setting; and providing a quantization parameter value determined through the rate quantization model to an encoder unit based on the input bit count. The rate quantization model is updated according to a prediction bit count information predicted from a BIN count information of a current or delay frame encoded in an encoder unit and the delay bit count information of the delay frame obtained from an offline context-adaptive binary arithmetic coding CABAC module.

13 Claims, 4 Drawing Sheets

(56) References Cited

FOREIGN PATENT DOCUMENTS

| KR | 10-2006-0019801 A | 3/2006 |
|---|---|---|
| KR | 10-2009-0074173 A | 7/2009 |
| KR | 10-2012-0012634 A | 2/2012 |

* cited by examiner

FIG. 1

BIT PREDICTION BASED BIT RATE CONTROL METHOD AND APPARATUS FOR VIDEO CODING PROCESS SUPPORTING OFFLINE CABAC

TECHNICAL FIELD

The present invention relates to a video coding process, and more particularly, to a bit prediction based bit rate control method and apparatus for a video coding process supporting an offline CABAC.

BACKGROUND ART

Digital video technologies can be integrally applied into wide range of digital video devices including digital televisions, digital direct broadcast systems, wireless broadcast systems, personal digital assistants PDAs, laptop or desktop computers, digital cameras, digital recording devices, video gaming devices, video game consoles. Digital video devices implement video compression technologies such as MPEG-2, MPEG-4, or ITU-T H.264/MPEG-4, Part 10, advanced video coding AVC, and HEVC to more efficiently transmit and receive the digital video information. The video compression techniques perform spatial prediction and temporal prediction to remove or reduce the redundancy inherent in the video sequence.

By implementing the compression technique, the multimedia data compressed efficiently by the encoder is transmitted to a destination via a network in the form of a bitstream, and then reconstructed and reproduced by the decoder.

However, for smoothly reproducing, it is necessary to encode simultaneously considering of the network bandwidth, the amount of buffer used to store the compressed bitstream, the amount of input bits, and the amount of output bits. Data exceeding the allowable range of the transmission bandwidth may cause congestion in the network and may be impossible to decode the image.

To solve this problem, the image must be compressed at a bit rate that can be smoothly transmitted at the network channel bandwidth in the encoding process, and rate control techniques are required to ensure maximum image quality at a corresponding bit rate, and various algorithms have been developed for this purpose.

Generally, when the target bit rate is set, it is determined a QP that is predicted to generate a target bit count by modeling the relationship between bit count (or bit amount) and the QP as a function, generated a bit string corresponding to an actual bit count according to perform encoding using the QP predicted through such modeling, and the QP and the bit rate can be adjusted in a manner that of updating the previously modeled relational function according to the QP and actual generated bit string for the immediately preceding encoded block.

Further, in such a rate control, since the target bit count corresponding to the target bit rate is adjusted by Leaky bucket model so that the level of the picture buffer such as CPB (Coded Picture Buffer) is increased or decreased such that it is not overflowed or underflowed compared to the buffer storage amount, then the maximum image quality can be achieved considering the buffer level and the target bit rate by adjusting between the appropriate bit rate and the QP.

On the other hand, context-based adaptive binary arithmetic coding CABAC is one type of entropy coding technology currently supported in several coding standards such as ITU-T H.264/MPEG4, AVC and HEVC standards. The CABAC can perform a process involving several stages including a binarization, the choice of a context model, and binary arithmetic coding. In the binarization, any non-binary symbols are mapped to a binary sequence (also called a BIN string). In the context modeling, the model probability distribution is assigned to an element (e.g., a symbol) to be coded. Thereafter, in a subsequent binary arithmetic coding stage, the assigned probability distribution is used to perform coding to generate a sequence of bits forming a coded expression of an element that is coded according to the assigned model probability distribution. That is, the CABAC process can compress the elements that define the video stream without loss by knowing the probability of the element in the given context.

However, in implementing the CABAC process on a hardware encoder, the execution speed tends to be proportional to the encoding bit rate. Thus, as shown in FIG. 1A, when the CABAC module is operated by a pipeline with other hardware blocks, there is a problem that a pipeline stall is occurred when a block having a large bit rate is generated due to execution delay by the CABAC even through that other hardware, except CABAC, guarantees a constant execution speed regardless of the bit rate.

FIG. 1B is proposed for the purpose of eliminating the speed difference between different hardware in order to solve this problem, it is illustrated a structure that the CABAC is operated independently off-line with other pipelined hardware. This is called an offline CABAC module. The offline CABAC modules can eliminate pipeline stalls due to speed differences between different hardware by operating at least the delay longer than the frame, thereby guaranteeing a constant encoding speed according to the encoding rate.

However, as such the offline CABAC is currently associated with the above-described rate control technology, there is a problem that the accurate rate control can not be performed in real time, since the CABAC encoded bit count used in the relational update is a bit count of the frame with at least one frame delay.

Particularly, when the characteristic of the input YUV value is greatly changed as in a scene change, there is a problem that the rate control performance deteriorates such as overflow of the buffer model due to failure to reflect the changed characteristics.

DISCLOSURE

Technical Problem

The present invention has been made to solve the above problems, and it is an object of the present invention to provide a bit prediction based bit rate control method and apparatus of a video coding process, which prevent the deterioration of rate control performance caused by implementing an offline context-adaptive binary arithmetic coding CABAC and support the offline context-adaptive binary arithmetic coding CABAC that can minimize errors.

Technical Solution

According to an aspect of the present invention, there is provided a A bit rate control methods comprising: determining an input bit count for a rate quantization model according to a target bit rate setting; and providing a quantization parameter value determined through the rate quantization model to an encoder unit based on the input bit count; wherein the rate quantization model is updated according to a prediction bit count information predicted from a BIN count information of a current or delay frame encoded in an encoder unit and the delay bit count information of the delay frame obtained from an offline context-adaptive binary arithmetic coding CABAC module.

According to other aspect of the present invention, there is provided a bit rate control apparatus comprising: an input bit allocation unit for determining an input bit count for a rate quantization model according to a target bit rate setting; and a rate quantization modeling unit for providing a quantization parameter value determined through the rate quantization model to an encoder unit based on the input bit count; wherein the rate quantization model is updated according to a prediction bit count information predicted from a BIN count information of a current or delay frame encoded in an encoder unit and the delay bit count information of the delay frame obtained from an offline context-adaptive binary arithmetic Coding CABAC module.

The method according to an embodiment of the present invention for solving the above problems can be implemented as a computer-readable recording medium recorded with a program for implementing the method.

Advantageous Effects

According to an embodiment of the present invention, it is possible to prevent rate control performance deterioration and to minimize errors that are occurred in realizing the offline CABAC by using more accurate bit count information by predicting the bit count information of the current frame based on the bit count information of the delay frame output from the offline CABAC process, and the bin count information of the encoding process and performing the update of the bit rate quantization model using the predictive bit count information.

Further, according to the embodiment of the present invention, it is possible to perform accurate buffer level calculation and bit count allocation corresponding to the target bit amount by processing the level correction according to the delay bit count information for preventing accumulation error of the buffer model based on the prediction bit count information.

DESCRIPTION OF DRAWINGS

FIG. 1 is a view for explaining a problem of an existing CABAC pipeline process and an offline CABAC.

DETAILED DECRYPTION OF THE INVENTION

Figure 2:
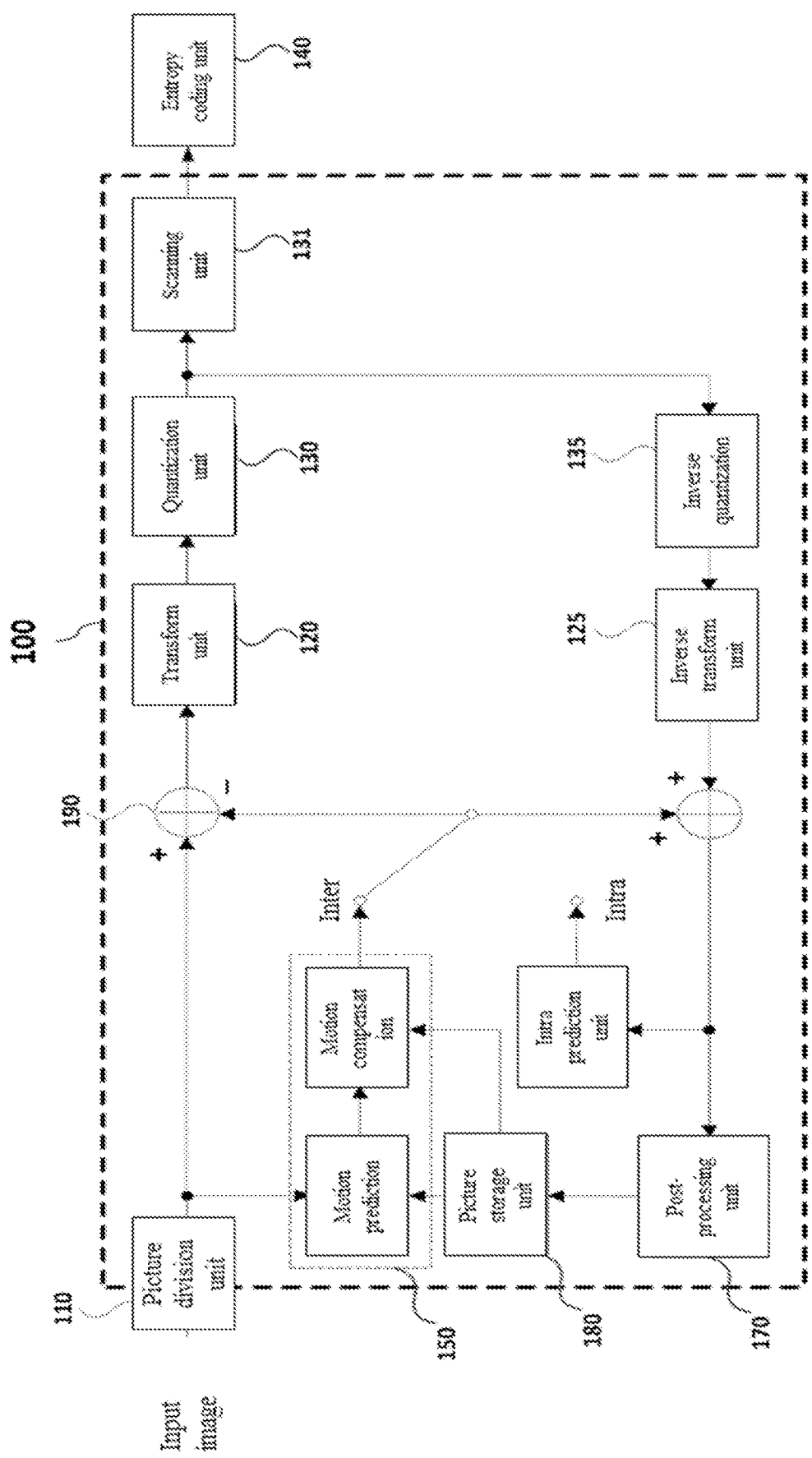
FIG. 2 is a view for explaining a configuration of a video encoding apparatus to which a rate control method according to an embodiment of the present invention is applied.

Hereinafter, embodiments of the present invention will be described in detail with reference to the accompanying drawings so that those skilled in the art can easily carry out the present invention. The present invention may, however, be embodied in many different forms and should not be construed as limited to the embodiments set forth herein. In order to clearly explain the present invention in the drawings, portions not related to the description are omitted, like numbers refer to like parts throughout the specification.

Throughout this specification, when an element is referred to as being "connected" to another element, this includes not only "directly connected" but also "electrically connected" between other devices in the middle portion.

Throughout this specification, when a member is located on another member, this includes not only when a member is in contact with another member but also when another member exists between the two members.

Throughout this specification, when a section is referred to as "containing" certain elements, this does not exclude other components unless specifically stated otherwise, but may also include other components. The terms "about", "substantially", etc. used to the extent that they are used throughout the specification are used in their numerical value or in close proximity to the numerical values when the manufacturing and material tolerances inherent in the meanings mentioned are presented, precise or absolute numerical values are used to prevent unauthorized exploitation of unauthorized disclosure by the disclosures referred to in order to facilitate understanding of the present disclosure. The term "step to" or "step of" used in the entire specification of the present invention does not mean "step for".

Throughout this specification, the term of these combinations included in the expression of the makushi type means one or more combinations or combinations selected from the group consisting of the constituents described in the expression of the form of a marker, it means at least one selected from the group consisting of the above elements.

In addition, as an example of a method of encoding an actual image and its depth information map, it may be performed the encoding using the moving picture experts group (MPEG) which have the highest coding efficiency among the video coding standards developed so far, and HEVC (High Efficiency Video Coding) commonly standardized in the video coding expert group (VCEG), but the present invention is not limited thereto.

Generally, an encoding apparatus includes an encoding process (or a coding process) and a decoding process, and a decoding apparatus has a decoding process. The decoding process of the decoding apparatus is the same as the decoding process of the encoding apparatus.

In addition, the rate control according to an embodiment of the present invention is an issue generally applied to the encoding apparatus. Therefore, the encoding apparatus will be mainly described below.

FIG. 2 is a block diagram illustrating a configuration of a video encoding apparatus according to the present invention.

The video coding apparatus 100 includes a picture division unit 110, a transform unit 120, a quantization unit 130, a scanning unit 131, an entropy coding unit 140, an intra-prediction unit 150, an inter-prediction unit 160, an inverse quantization unit 135, an inverse transformation unit 125, a post-processing unit 170, a picture storage unit 180, a subtraction unit 190, and an addition unit 195.

The picture division unit 110 determines a prediction mode by analyzing the input video signal and dividing the picture into coding units of a predetermined size for each coding tree unit CTU, and then determines the size of the prediction unit for each coding unit.

The picture division unit 110 sends the prediction unit to be encoded to the intra-prediction unit 150 or the inter-prediction unit 160 depending on the prediction mode (or prediction method). In addition, the picture division unit 110 sends the prediction unit to be encoded to the subtraction unit 190.

The picture is composed of a plurality of slices, the slice may be composed of a plurality of coding tree units CTUs which are the maximum coding units.

The CTU may be divided into a plurality of coding units CUs, the encoder can add information (flag) indicating whether or not to be fragmented to the bitstream. The decoder can recognize the position of the CTU using an address CtuAddr.

The coding unit CU in the case where the division is not allowed is regarded as a prediction unit PU, the decoder can recognize the position of the PU using a PU index.

The prediction unit PU may be divided into a plurality of partitions. Also, the prediction unit PU may be composed of a plurality of transform units TUs.

In this case, the picture division unit 110 may send the image data to the subtraction unit 190 with a block unit (for example, in units of PU or TU) of a predetermined size according to the determined encoding mode.

The coding tree unit CTU is used as a unit of video encoding, and the CTU is defined as various square shapes. The CTU includes the coding unit CU.

The coding unit CU has a quad tree shape, the encoding is performed by recursively searching an optimum prediction, as the depth is set to 3 from 0, that is, unit up to an 8×8 coding unit CU when the maximum size of the coding unit is 64×64.

The prediction unit for performing the prediction is defined as a prediction unit PU, each of the coding units CU performs the prediction by a unit divided into a plurality of blocks, the prediction is performed by dividing into a square and a rectangle.

The transform unit 120 transforms the original block of the input prediction unit and the residual block which is the residual signal of the prediction block generated by the intra-prediction unit 150 or the inter-prediction unit 160. The residual block is composed of the coding unit or the prediction unit. The residual block composed of the coding unit or the prediction unit is divided into optimum transform units to transform. Different transformation matrices can be determined depending on the prediction mode (intra or inter-prediction mode). In addition, the transformation matrix may be adaptively determined according to the intra-prediction mode since the intra-prediction residual signal has directionality according to the intra prediction mode.

The transform unit TU can be transformed by one-dimensional transform one matrix of two (horizontal, vertical). For example, the predetermined transform matrix is determined in the case of the inter prediction.

On the other hand, in the case of the intra prediction mode is horizontal, a DCT-based integer matrix is applied in the vertical direction, the probability that the residual block has directionality in the vertical direction becomes high. While, in the horizontal direction, a DST-based or KLT-based integer matrix is applied. If the intra prediction mode is vertical, the DST-based or KLT-based integer matrix is applied in the vertical direction, and the DCT-based integer matrix is applied in the case of the horizontal direction.

In case of DC mode, the DCT-based integer matrix is applied in both directions. Also, in the case of intra prediction, the transform matrix may be adaptively determined depending on the size of the transform unit.

The quantization unit 130 determines a quantization step size for quantizing the coefficients of the residual block transformed by the transform matrix. The quantization step size is determined for each coding unit having a predetermined size or larger (hereinafter, referred to as a quantization unit).

The predetermined size may be 8×8 or 16×16. Then, coefficients of the transform block are quantized using a quantization matrix determined according to the determined quantization step size and the prediction mode.

The quantization unit 130 uses the quantization step size of the quantization unit adjacent to the current quantization unit as a quantization step size predictor of the current quantization unit.

The quantization unit 130 may generate the quantization step size predictor for the current quantization unit by searching the left quantization unit, the upper quantization unit, and the upper left quantization unit of the current quantization unit in order and using one or two effective quantization step sizes.

For example, the effective first quantization step size searched in the above order may be determined as the quantization step size predictor. In addition, an average value of two valid quantization step sizes found in the above order may be determined as the quantization step size predictor. If only one is valid, it can be determined as the quantization step size predictor.

If the quantization step size predictor is determined, a difference value between the quantization step size of the current coding unit and the quantization step size predictor is transmitted to the entropy coding unit 140.

Meanwhile, there is the possibility that the left coding unit, the upper coding unit, and the upper left coding unit of the current coding unit are not present. On the other hand, there may be a coding unit that exists before in the coding order in the maximum coding unit.

Therefore, The quantization step size of the quantization unit immediately before the encoding order can be a candidate in the quantization unit adjacent to the current coding unit and the maximum coding unit.

In this case, the priority can be given in the following order (1) the left quantization unit of the current coding unit, (2) the upper quantization unit of the current coding unit, (3) the upper left side quantization unit of the current coding unit, (4) The quantization unit immediately before the encoding order. The order may be changed, and the upper left side quantization unit may be omitted.

The quantized transform block is provided to the inverse quantization unit 135 and the scanning unit 131.

The scanning unit 131 scans the coefficients of the quantized transform block and transforms into one-dimensional quantization coefficients. Since the coefficient distribution of the transform block after quantization may be dependent on the intra prediction mode, the scanning method is determined according to the intra prediction mode.

Also, the coefficient scanning method may be determined differently depending on the size of the transform unit. The scan pattern may vary according to the directional intra prediction mode. The scan order of the quantization coefficients is scanned in the reverse direction.

When the quantized coefficients are divided into a plurality of subsets, the same scan pattern is applied to the quantization coefficients in each subset. The scan pattern between subsets applies a zigzag scan or a diagonal scan. The scan pattern is preferably scanned to the remaining subsets from the main subset containing DC in the forward direction, but the reverse direction is also available.

It is also possible to set the scan pattern between subsets in the same manner as the scan pattern of quantized coefficients in the subset. In this case, the scan pattern between the subset is determined according to the intra prediction mode. On the other hand, the encoder transmits to the decoder information indicating the position of the last non-zero quantization coefficient in the transform unit.

Information for indicating the position of the last non-zero quantization coefficient in each subset can also be transmitted to the decoder.

The inverse quantization unit 135 dequantizes the quantized quantization coefficients. The inverse transformation unit 125 reconstructs the dequantized transform coefficients into residual blocks in the spatial domain. The adder combines the residual block reconstructed by the inverse transform unit and the received prediction block from the intra-prediction unit 150 or the inter-prediction unit 160 to generate a reconstruction block.

The post-processing unit 170 performs a deblocking filtering process for eliminating the blocking effect occurring in the reconstructed picture, an adaptive offset applying process for compensating a difference value between the original image with a pixel unit, and an adaptive loop filtering process for compensating the difference between the original image with the coding unit.

The deblocking filtering process is preferably applied to a boundary of the prediction unit and the transform unit having a size larger than a predetermined size. The size may be 8×8. The deblocking filtering process includes the steps of determining a boundary to be filtered, determining a bounary filtering strength to be applied to the boundary, determining whether to apply the deblocking filter, and selecting a filter to be applied to the boundary when it is determined to apply the deblocking filter.

The application of the deblocking filter is determined by one of conditions (i) whether the boundary filtering strength is greater than zero or (ii) whether the value, indicating the degree of change of pixel values at the boundary of two blocks (P block, Q block) adjacent to the boundary to be filtered, is less than the first reference value determined by the quantization parameter.

The filter is preferably at least two. If the absolute value of the difference between two pixels located at the block boundary is greater than or equal to the second reference value, a filter for performing relatively weak filtering is selected.

The second reference value is determined by the quantization parameter and the boundary filtering strength.

The adaptive offset application process is intended to reduce the distortion between the pixels in the image to which the deblocking filter is applied and the original pixels. It may be determined whether to perform the adaptive offset applying process in units of pictures or slices.

The picture or slice may be divided into a plurality of offset regions, the offset type can be determined for each offset region. The offset type may include a predetermined number (e.g., four) of edge offset types and two band offset types.

If the offset type is an edge offset type, the corresponding offset is applied by determining the edge type to which each pixel belongs. The edge type is determined based on the distribution of the current pixel and two pixel values adjacent to the current pixel.

The adaptive loop filtering process can perform a filtering based on a value obtained by comparing a reconstructed image and an original image through the deblocking filtering process or the adaptive offset applying process. The adaptive loop filtering ALF can be applied to the entire pixels included in the 4×4 block or the 8×8 block.

Whether or not the adaptive loop filter is applied can be determined for each coding unit. The size and the coefficient of the loop filter to be applied may vary depending on each coding unit. Information indicating whether or not the adaptive loop filter is applied to each coding unit may be included in each slice header. However, the adaptive loop filtering process may be omitted according to the change of the encoding standard method.

In the case of the color difference signal, it is possible to determine whether or not the adaptive loop filter is applied with the picture unit. The shape of the loop filter may have a rectangular shape unlike the luminance.

The adaptive loop filtering can determine whether to apply on a slice basis. Therefore, information indicating whether or not the adaptive loop filtering is applied to the current slice is included in the slice header or the picture header.

If it is indicated that the adaptive loop filtering is applied to the current slice, the slice header or picture header further includes information indicating the horizontal and/or vertical direction filter length of the luminance component used in the adaptive loop filtering process.

The slice header or picture header may include information indicating the number of filter sets. At this time, if the number of filter sets is two or more, the filter coefficients can be encoded using the prediction method. Accordingly, the slice header or the picture header may include information indicating whether or not the filter coefficients are encoded in the prediction method, and it is included the predicted filter coefficients when the prediction method is used.

On the other hand, not only luminance but also chrominance components can be adaptively filtered. Therefore, the slice header or the picture header may include information indicating whether or not each of the color difference components is filtered. In this case, in order to reduce the number of bits, information indicating whether to perform filtering on Cr and Cb may be joint-coded (i.e., multiplexed coding).

In this case, in the case of the chrominance components, since it is most likely that Cr and Cb are not filtered in order to reduce the complexity, the smallest index is allocated and the entropy encoding is performed when both Cr and Cb are not filtered.

In the case that both Cr and Cb are filtered, the largest index is allocated to perform the entropy encoding.

The picture storage unit 180 receives the post-processed image data from the post-processing unit 170, and reconstructs and stores the image in the picture unit. The picture may be a frame-based image or a field-based image. The picture storage unit 180 has a buffer (not shown) for storing a plurality of pictures.

The inter-prediction unit 160 performs a motion estimation using at least one reference picture stored in the picture storage unit 180, a reference picture index indicating a reference picture and a motion vector are determined.

In accordance with the determined reference picture indexes and motion vector, it is extracted and output the prediction block corresponding to the prediction unit to be coded from the reference picture used for the motion estimation among a plurality of reference pictures stored in the picture storage unit 180.

The intra-prediction unit 150 performs the intra-prediction encoding using the reconfigured pixel values in the picture including the current prediction unit.

The intra prediction unit 150 receives the current prediction unit to be predictively encoded and performs the intra-prediction by selecting one of a predetermined number of the intra prediction modes according to the size of the current block.

The intra-prediction unit 150 adaptively filters the reference pixels to generate intra prediction blocks. If the reference pixels are not available, the reference pixels may be generated using available reference pixels.

The entropy coding unit 140 may entropy-encode the quantization coefficients quantized by the quantization unit 130, the intra prediction information received from the intra prediction unit 150, and the motion information and the like received from the inter-prediction unit 160.

Here, the entropy coding unit 140 according to an embodiment of the present invention can be implemented to operate independently of other components. Accordingly, the image encoding apparatus can be divided into the encoder unit 100 and the entropy coding unit 140. However, this is for convenience of explanation of the entropy coding unit 140, it is obvious that other components of the encoder unit 100 may be combined or separated.

Figure 1:
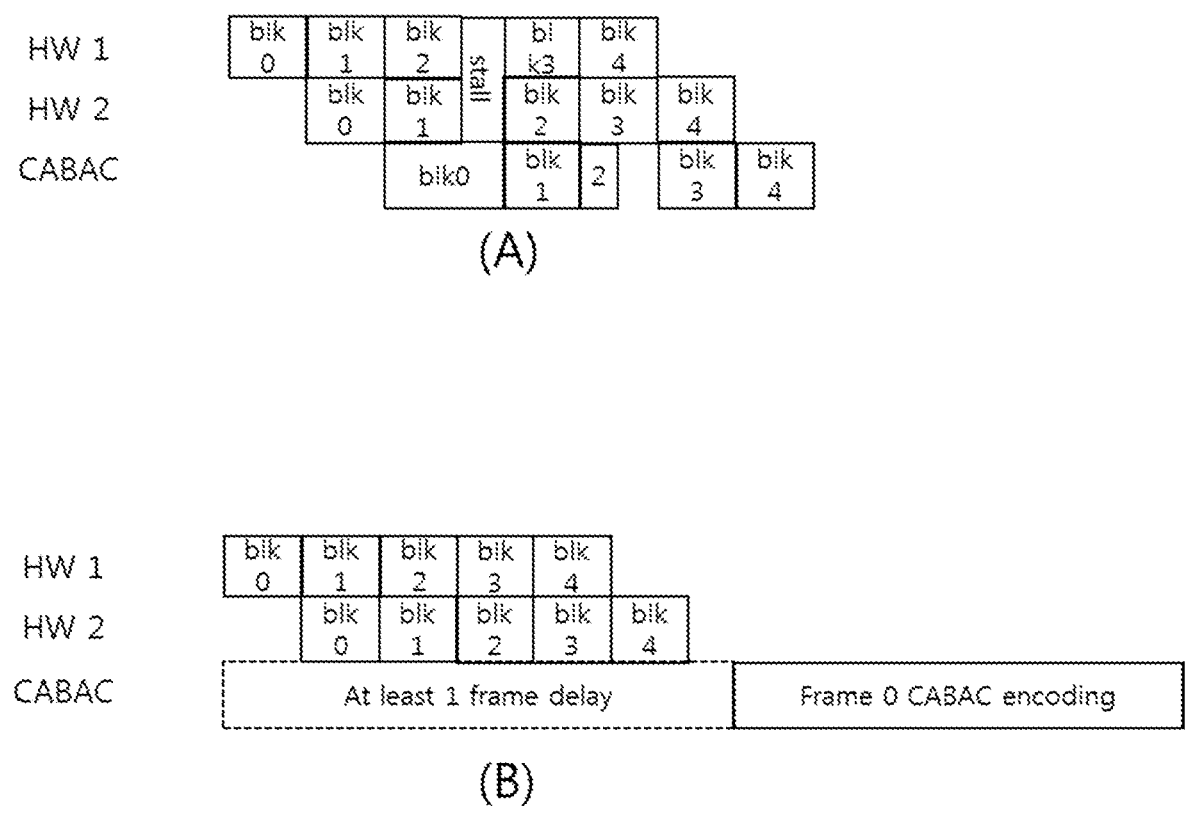

Particularly, according to the embodiment of the present invention, the entropy coding unit 140 may include an offline CABAC (Context-Adaptive Binary Arithmetic Coding) module 141 and may process the operation independent of other hardware pipelined. Basically, the CABAC processes the same operation as shown in FIG. 1B, and it is possible to solve the pipeline stall problem due to the difference in speed between different hardware caused by increasing in bit rate.

As shown in FIG. 1B, the offline CABAC encoding module 140 according to the embodiment of the present invention can facilitate synchronization with other hardware by processing frames delayed by more than one frame.

In order to solve the above-described problems caused by this, the off-line CABAC encoding module 141 of the entropy coding unit 140 according to the embodiment of the present invention may be used to perform the QP value which is appropriate to necessary for the operation of the encoder unit 100 processing the prediction coding and quantization of the image coding apparatus in cooperation with the rate control device 200 according to the embodiment of the present invention. To this end, the offline CABAC encoding module 141 transmits the delayed bit count to the rate control device 200 to determine the prediction bit count information in the rate control apparatus 200. This will be described later in more detail with reference to FIG. 3.

Figure 3:
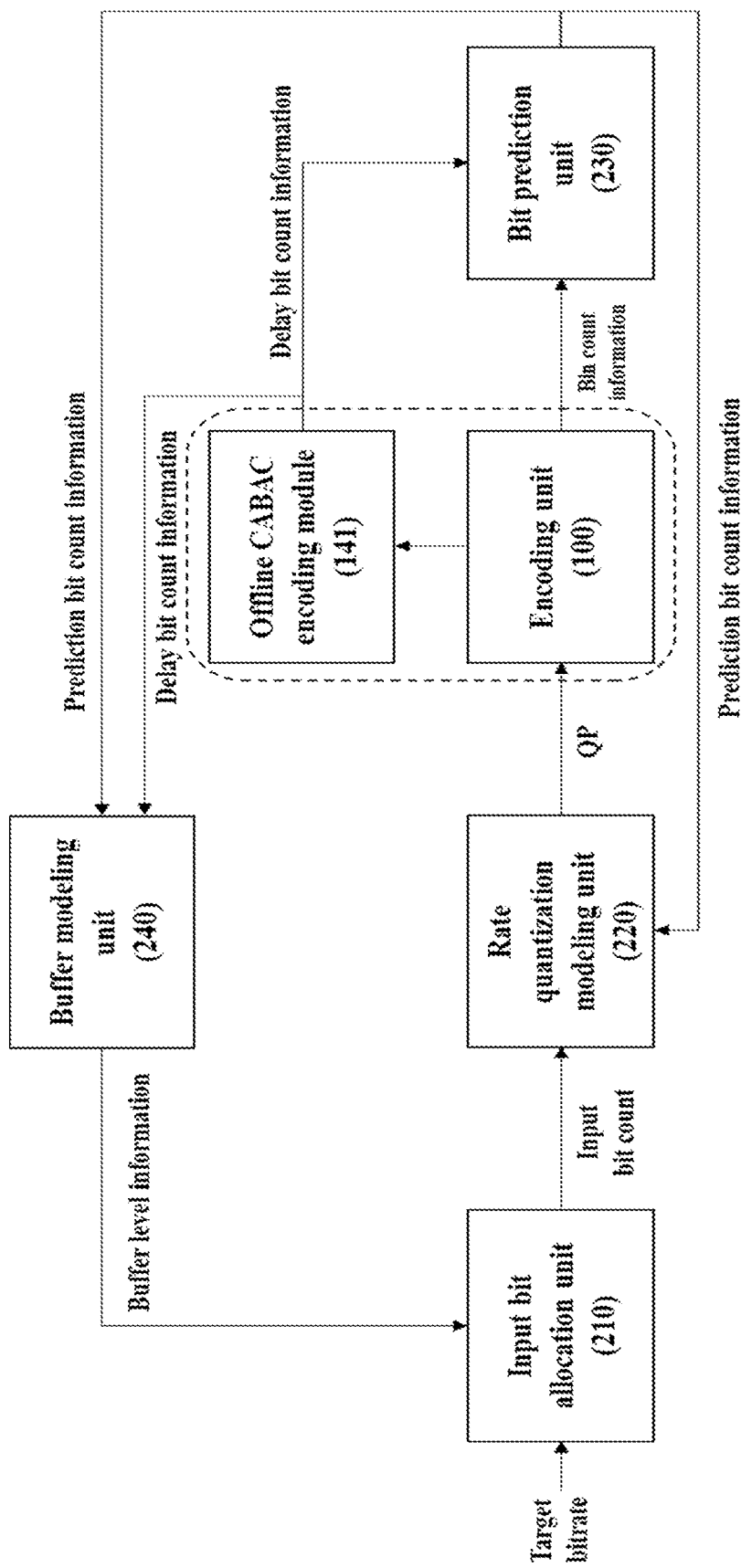
FIG. 3 is a block diagram illustrating a rate control apparatus according to an embodiment of the present invention.

FIG. 3 is a block diagram illustrating the rate control apparatus according to the embodiment of the present invention.

Referring to FIG. 3, the rate control apparatus 200 according to the embodiment of the present invention includes an input bit allocation unit 210, a rate quantization modeling unit 220, a bit prediction unit 230, and a buffer modeling unit 240, and provides to the encoder unit 100 with the QP (quantization parameter) value based on the prediction bit count information and the target bit count by interworking the encoder unit 100 and the offline CABAC encoding module 141 of the image encoding apparatus with each other. For example, the QP value can be used for the quantization processing of the encoder unit 100, and thus the image quality can be adjusted.

Particularly, according to the embodiment of the present invention, it is determined the input bit count for the rate quantization model according to the target bit rate setting, the quantization parameter value determined through the rate quantization model to the encoder unit 100 based on the input bit count. The rate quantization model is updated according to the prediction bit count information predicted from a bin count information of the current or delay frame encoded in an encoder unit and the delay bit count information of the delay frame obtained from the offline context-adaptive binary arithmetic coding CABAC module 141. Here, the offline CABAC encoding module 141 process a context-adaptive binary arithmetic coding of previous frames delayed by a preset delay value from a current frame processed by the encoder unit by asynchronously operating with a hardware pipeline of the encoder unit.

More specifically, the input bit allocation unit 210 may receive the target bit rate according to the user input or setting, the input bit count is determined based on the input target bit rate and the buffer level information of the buffer modeling unit 240.

Also, the input bit allocation unit 210 can adjust the bit count by referring to the buffer level information. The input bit allocation unit 210 performs to be reduced the input bit count when the buffer level of the buffer modeling unit 240 is close to the overflow, increased the input bit count when the buffer level is close to the underflow.

The input bit allocation unit 210 outputs the determined input bit count to the rate quantization modeling unit 220.

The rate quantization modeling unit 220 determines the QP value that can achieve the target bit rate and outputs to the encoder unit 100 based on the input bit count by applying to a predetermined rate quantization model.

The rate quantization modeling unit 220 may include the rate quantization model in the form of a function based on the bit distribution model for rate control. In particular, the rate quantization modeling function according to the embodiment of the present invention may include a prediction model in the form of a degree function formed based on the QP value and the prediction bit count information predicted by the bit predictor 230. In addition, a suitable rate quantization model may be preset depending on the complexity and prediction performance of the encoder. In addition to the QP value and the quantized prediction bit count information, other various information for predicting the optimal QP may be further used.

According to this configuration, if the conventional rate quantization model function is implemented in the form of QP=F (input bit count) and updated by the bit count outputted from the actual encoder unit 100, the quantization model function of the rate quantization modeling unit 220 according to the embodiment of the present invention can perform update using the predictive bit count information output from the bit prediction unit 230.

The bit prediction unit 230 calculates the prediction bit count information to be applied to the rate quantization modeling unit 220 using the bin count information output from the encoder unit 100 and the delay bit count information of the delay frame output from the offline CABAC encoding module 141, and outputs the prediction bit count information to the rate quantization modeling unit 220 and the buffer modeling unit 240.

More specifically, the bit prediction unit 230 can receive the bit count information (Prev bit count) corresponding to the delay frame from the offline CABAC encoding module 141.

Also, the bit prediction unit 230 may receive the bin count information including regular bin count information (Prev regular bin count) corresponding to previous frame (delay frame) preceding by the delay value set in the offline CABAC encoding module 141 from the encoder unit 100, bypass bin count information (Prev bypass bin count) corresponding to the previous frame, regular bin count information for the current frame (Curr regular bin count), and bypass bin count information of the current frame (Curr bypass bin count).

The bit prediction unit 230 may calculate the regular bit count (Prev regular bit count) value of the delay frame according to Equation 1.

$$\text{Prev regular bit count} = \text{prev bit count} - \text{prev bypass bin count} \quad \text{Equation 1}$$

Equation 1 is derived from the fact that the bypass bin count is very similar to the bypass bit count value and the regular bit count value of the delay frame can be predicted using thereof.

Also, the bit prediction unit 230 may calculate the regular bit ratio according to Equation 2 by using the regular bit count of the delay frame calculated as described above.

$$\text{regular bit ratio} = 0.5 * (\text{regular bit ratio} + \text{prev regular bin count}/\text{prev regular bit count}) \quad \text{Equation 2}$$

According to the above process, the bit prediction unit 230 can calculate the final estimated bit count corresponding to the current frame according to Equation 3.

$$\text{estimated bit count} = \text{curr regular bin count} * \text{regular bit ratio} + \text{curr bypass bin count} \quad \text{Equation 3}$$

As shown in Equations 1 to 3, in the process of calculating the predictive bit count information, the bin count information may include regular bin count information and the bypass bin count information of the current or delay frame. The bit prediction unit 230 calculates a value obtained by multiplying the regular bin count of the current frame by the regular bit rate, and a value obtained by adding the bypass bin count of the current frame as the prediction bit count. The regular bit rate may be obtained based on the bypass bin count of the delay frame, the regular bit count of the delay frame predicted from the bit count of the delay frame, and the regular bin count of the delay frame.

Accordingly, the prediction bit count of the current frame other than the delay frame output from the offline CABAC encoding module 141 can be determined, and the more accurate rate quantization model by the prediction bit count can be determined.

For this purpose, the bit prediction unit 230 may transmit the prediction bit count information predicted by the above-described operation to the rate quantization modeling unit 220. Accordingly, the quantization modeling unit 220 can use the prediction bit count information by replacing the actual bit count information necessary for updating the rate quantization model. Thus, it is prevented erroneous rate quantization modeling by using the bit count of the previous frame from the off-line CABAC encoding module 141 and used more accurate bit count information, so that an appropriate QP value can be set even if the offline CABAC encoding module 141 is used.

On the other hand, the buffer modeling unit 240 can correct the buffer level based on the received or delayed bit count information and the prediction bit count information from the offline CABAC encoding module 141, and it is possible to prevent the overflow or the underflow caused by the delay bit count and to set an appropriate buffer level to be maintained by transferring the buffer level information according to the corrected buffer level to the input bit allocation unit 210.

For this, the buffer modeling unit 240 may obtain the prediction bit count information including the prediction bit count information (Curr estimated bit count) of the current frame and the prediction bit count information (Prev estimated bit count) corresponding to the delay frame from the bit prediction unit 230.

The buffer modeling unit 240 may receive the actual delay bit count information (Prev real bit count) generated according to the CABAC coding for the delay frame from the offline CABAC encoding module 141.

The buffer modeling unit 240 may calculate the delay bit error (Prev bit error) according to the delay bit count information and the prediction bit count information. For example, the buffer modeling unit 240 may perform an operation such as Equation 4 with the obtained values as variables.

$$\text{Prev bit error} = \text{Prev estimated bit count} - \text{Prev real bit count} \quad \text{Equation 4}$$

The buffer modeling unit 240 calculates the target bit count value obtained by dividing the target bit rate input by the user by the frame rate. Also, in determining the current buffer level based on the target bit count, it is possible to perform the correction using the delay bit error. Accordingly, the buffer modeling unit 240 can process the following Equation 5.

$$\text{Buffer level} = \text{Buffer level} + \text{Curr estimated bit count} - \text{Target bit count} - \text{Prev bit error} \quad \text{Equation 5}$$

As shown in Equations 4 to 5, the buffer level of the buffer modeling unit 240 can be corrected by the obtained delay bit error according to the prediction bit count information and the delay bit count information of the CABAC encoding module, the delay bit error may be determined according to a difference between the delay frame and the prediction bit count obtained from the prediction bit count information and the actual bit count of the delay frame. Accordingly, the buffer level can be adjusted with a value obtained by subtracting the input bit count and the delay bit error from a value obtained by adding the prediction bit count of the current frame to an existing buffer level.

According to the buffer level adjustment as described above, the adjusted buffer level corresponding to the target bit rate can be adjusted so as not to overflow or underflow due to accumulation of the delay bit error and the like. Therefore, even when the offline CABAC encoding module 141 is provided, smooth rate control can be performed without error at the buffer level.

Figure 4:
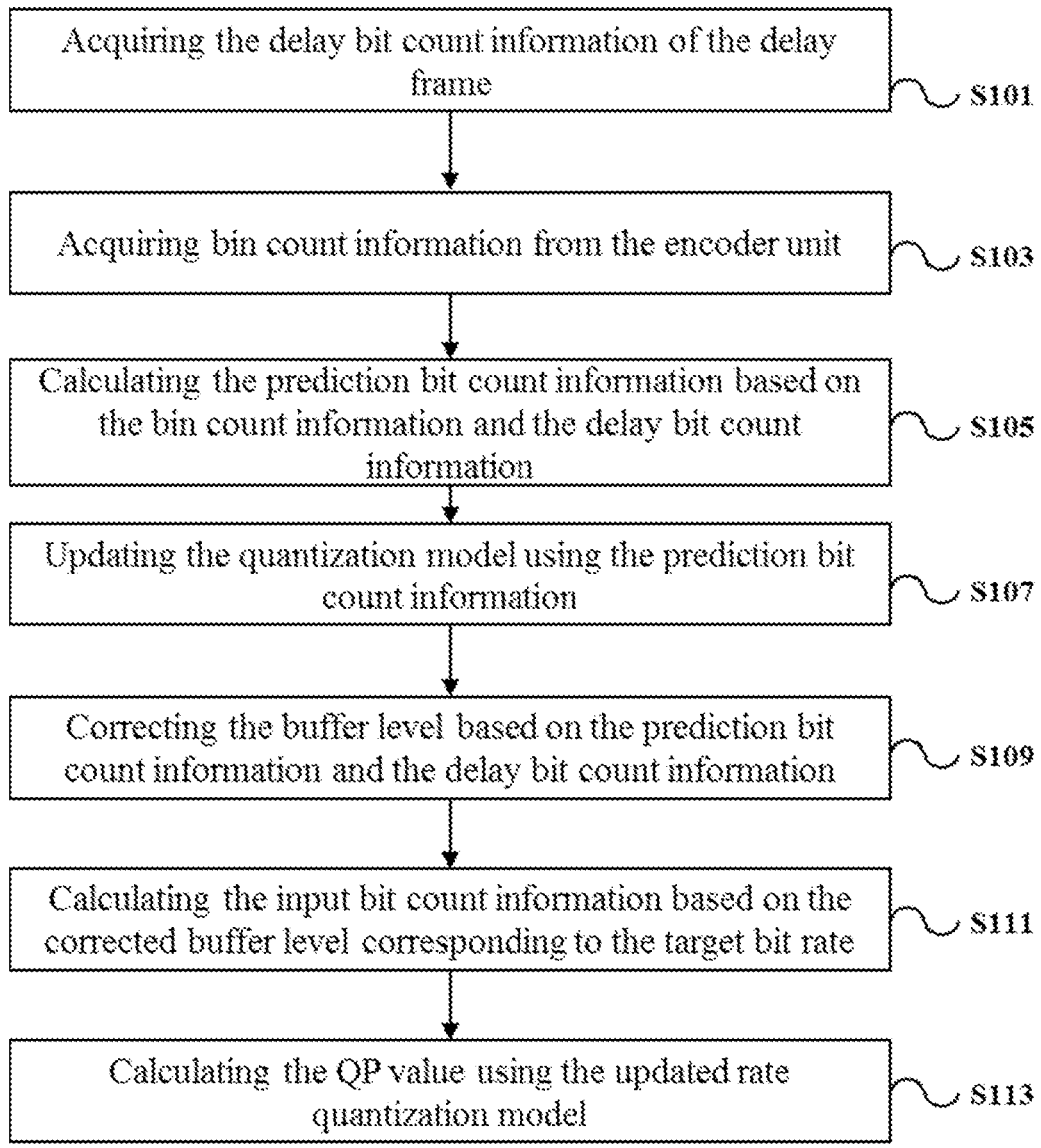
FIG. 4 is a flowchart illustrating a rate control method according to an embodiment of the present invention.

FIG. 4 is a flowchart illustrating a rate control method according to an embodiment of the present invention.

Referring to FIG. 4, the rate control apparatus 200 according to the embodiment of the present invention first acquires the delay bit count information of the delay frame from the offline CABAC encoding module 141 through the bit prediction unit 230 and the buffer modeling unit 240 (S101).

Then, the rate control apparatus 200 acquires bin count information from the encoder unit 100 through the bit prediction unit 230 (S103).

Then, the rate control device 200 calculates the prediction bit count information based on the bin count information and the delay bit count information (S105).

Here, the calculation for calculating the prediction bit count information may use Equations 1 to 3 described above.

Thereafter, the rate control apparatus 200 performs the updating the quantization model using the prediction bit count information through the rate quantization modeling unit 220 (S107).

Meanwhile, the rate control apparatus 200 corrects the buffer level based on the prediction bit count information and the delay bit count information through the buffer modeling unit 240 (S109).

Here, the delay bit error and level correction operation for the buffer level correction can use Equations 4 to 5.

When the target bit rate is input through the target bit allocation unit 210, the rate control apparatus 200 calculates the input bit count information based on the corrected buffer level corresponding to the target bit rate, the input bit count is input to the rate quantization modeling unit 220 (S111).

Accordingly, the rate quantization modeling unit 220 of the rate control device 200 calculates the QP value using the updated rate quantization model in accordance with the prediction bit count information (S113).

Accordingly, the calculated QP value is input to the encoder unit 100 so that the bitstream having the optimal image quality corresponding to the target bit rate can be output.

According to an embodiment of the present invention, it is possible to prevent a rate control performance deterioration and to minimize errors that are occurred in realizing the offline CABAC by using more accurate bit count information, by predicting the bit count information of the current frame based on the bit count information of the delay frame output from the offline CABAC process and the bin count information of the encoding process and performing the update of the bit rate quantization model using the predictive bit count information.

Further, according to the embodiment of the present invention, it is possible to perform accurate buffer level calculation and bit count allocation corresponding to the target bit amount by processing the level correction according to the delay bit count information for preventing accumulation error of the buffer model based on the prediction bit count information.

The method according to the present invention may be implemented as a program for execution on a computer and stored in a computer-readable recording medium. Examples of the computer-readable recording medium include a ROM, a RAM, a CD-ROM, Floppy disks, and optical data storage devices.

The computer-readable recording medium may be distributed over a networked computer system so that computer readable code can be stored and executed in a distributed manner. And, functional programs, codes and code segments for implementing the above method can be easily inferred by programmers of the technical field to which the present invention belongs.

While the present invention has been particularly shown and described with reference to exemplary embodiments thereof, it is to be understood that the invention is not limited to the disclosed exemplary embodiments, but, on the contrary, It will be understood by those skilled in the art that various changes and modifications may be made without departing from the spirit and scope of the present invention.

What is claimed is:

1. A bit rate control method comprising:
   determining an input bit count for a rate quantization model according to a target bit rate setting; and
   providing a quantization parameter value determined through the rate quantization model to an encoder unit based on the input bit count,
   wherein the rate quantization model is updated according to prediction bit count information predicted from BIN count information of a current frame or a delay frame encoded in the encoder unit and delay bit count information of the delay frame obtained from an offline context-adaptive binary arithmetic coding (CABAC) encoding module,
   wherein the determining the input bit count for the rate quantization model according to a target bit rate setting comprises determining the input bit count according to a buffer level of a buffer modeling unit, and
   wherein the buffer level is corrected by a delay bit error obtained according to the prediction bit count information and the delay bit count information of the offline CABAC encoding module.

2. The bit rate control method of claim 1, wherein the offline CABAC encoding module processes a context-adaptive binary arithmetic coding of previous frames delayed by a preset delay value from the current frame processed by the encoder unit by asynchronously operating with a hardware pipeline of the encoder unit.

3. The bit rate control method of claim 1, further comprising calculating the prediction bit count information,
   wherein the BIN count information includes regular bin count information and bypass bin count information of the current frame or the delayed frame, and
   wherein the prediction bit count information is obtained by multiplying a regular bin count of the current frame by a regular bit ratio and adding a bypass bin count of the current frame.

4. The bit rate control method of claim 3, wherein the regular bit ratio is obtained based on a regular bit count of the delay frame predicted from a bypass bin count of the delay frame and a bit count of the delay frame and a regular bin count of the delayed frame.

5. The bit rate control of claim 1, wherein the delay bit error is determined according to a difference between the delay frame and a prediction bit count obtained from the prediction bit count information and an actual bit count of the delay frame.

6. The bit rate control method of claim 5, wherein the buffer level is adjusted to subtract the input bit count and the delay bit error from a value obtained by adding a prediction bit count of the current frame to an existing buffer level.

7. A bit rate control apparatus comprising:
   an input bit allocation unit for determining an input bit count for a rate quantization model according to a target bit rate setting;
   a rate quantization modeling unit for providing a quantization parameter value determined through the rate quantization model to an encoder unit based on the input bit count; and
   a buffer modeling unit for determining a buffer level,
   wherein the rate quantization model is updated according to prediction bit count information predicted from BIN count information of a current frame or a delay frame encoded in the encoder unit and delay bit count information of the delay frame obtained from an offline context-adaptive binary arithmetic coding (CABAC) encoding module,
   wherein the input bit allocation unit determines the input bit count according to the buffer level of the buffer modeling unit, and
   wherein the buffer modeling unit corrects the buffer level by a delay bit error obtained according to the prediction bit count information and the delay bit count information of the offline CABAC encoding module.

8. The bit rate control apparatus of claim 7, wherein the offline CABAC encoding module processes a context-adaptive binary arithmetic coding of previous frames delayed by a preset delay value from the current frame processed by the encoder unit by asynchronously operating with a hardware pipeline of the encoder unit.

9. The bit rate control apparatus of claim 8, further comprising a bit prediction unit for calculating the prediction bit count information,
wherein the BIN count information includes regular bin count information and bypass bin count information of the current frame or the delayed frame, and
wherein the prediction bit count information is obtained by multiplying a regular bin count of the current frame by a regular bit ratio and adding a bypass bin count of the current frame.

10. The bit rate control apparatus of claim 9, wherein the regular bit ratio is obtained based on a regular bit count of the delay frame predicted from a bypass bin count of the delay frame and a bit count of the delay frame and a regular bin count of the delayed frame.

11. The bit rate control apparatus of claim 8, wherein the delay bit error is determined according to a difference between the delay frame and a prediction bit count obtained from the prediction bit count information and an actual bit count of the delay frame.

12. The bit rate control apparatus of claim 11, wherein the buffer level is adjusted to subtract the input bit count and the delay bit error from a value obtained by adding a prediction bit count of the current frame to an existing buffer level.

13. A non-transitory recording medium on which a program for causing a computer to execute the method of claim 1 is recorded.

* * * * *